(12) United States Patent
Jaeschke et al.

(10) Patent No.: US 6,188,552 B1
(45) Date of Patent: Feb. 13, 2001

(54) HIGH RESISTANCE GROUNDING SYSTEMS FOR OIL WELL ELECTRICAL SYSTEMS

(75) Inventors: James R. Jaeschke, Waukesha; William E. Berkopec, Wauwatosa, both of WI (US); David D. Shipp, Murrysville; Martin Baier, Cranberry Township, both of PA (US)

(73) Assignee: Eaton Corporation, Cleveland, OH (US)

(*) Notice: Under 35 U.S.C. 154(b), the term of this patent shall be extended for 0 days.

(21) Appl. No.: 09/130,568

(22) Filed: Aug. 7, 1998

(51) Int. Cl.[7] ................................................ H02H 3/16
(52) U.S. Cl. ............................ 361/48; 361/111; 361/115; 361/47; 361/86
(58) Field of Search ..................... 361/42, 58, 59–61, 361/10, 35, 78, 38, 86, 43, 50, 79, 115, 111; 307/89, 90, 100; 333/12, 177

(56) References Cited

U.S. PATENT DOCUMENTS

| 3,764,855 | * | 10/1973 | Beachley | 361/47 |
| 3,978,465 | * | 8/1976 | Goode | 340/651 |
| 4,228,475 | * | 10/1980 | Sherwood | 361/47 |
| 4,321,643 | * | 3/1982 | Vernier | 361/48 |
| 4,573,098 | * | 2/1986 | Williston | 361/42 |
| 4,816,956 | * | 3/1989 | Hertz et al. | 361/42 |
| 5,793,593 | * | 8/1998 | Reed et al. | 361/93 |

* cited by examiner

Primary Examiner—Jeffrey Gaffin
Assistant Examiner—Kim Huynh
(74) Attorney, Agent, or Firm—Martin J. Moran

(57) ABSTRACT

A normally ungrounded power system for a oil well is provided which includes a power transformer above ground and a pump motor below ground. There is provided a signal system which includes a below ground sensor system and an above ground signal conditioning and monitoring unit where the sensor system utilizes the main power lines for carrying the sensor signals. A connectable high resistance grounding scheme is provided to the aforementioned floating system, so that in the event of a arcing ground fault or similar occurrence the system may be immediately grounded, thus compensating for the effects of the arcing ground fault and providing personnel safety and electrical equipment protection. When the high resistance grounding system is not utilized the aforementioned signals from the sensors are easily carried by the power conductors.

42 Claims, 6 Drawing Sheets

HIGH RESISTANCE GROUNDING SYSTEMS FOR OIL WELL ELECTRICAL SYSTEMS

BACKGROUND OF THE INVENTION

1. Field of the Invention

The subject matter of this invention relates generally to high resistance grounded systems and more particularly to high resistance grounding schemes for oil well electrical systems.

2. Description of the Prior Art

Through the years oil well pump installations have utilized an ungrounded high voltage power system. A system of this type allows for the connection of an instrumentation signal system located deep in the well between the neutral of the oil well pump motor and the electrically conducting casing of the well. This saves considerable wiring expense, which would otherwise be necessary to traverse the great distance between the down hole sensor system and the surface signal measurement system. This system has a disadvantage in that the common mode voltage of a three-phase electrical system is not controlled because it is ungrounded and can thus reach extreme levels. This is hazardous to personnel and possibly destructive of electrical insulation. In such a system there is no intentional connection to ground. It has been found, though, that occasionally these ungrounded systems have exhibited unexplained, sometimes very wide spread, insulation failures with catastrophic results. It has been found that the source of these unexplained insulation failures often turns out to be an arcing ground fault condition deep in the well case structure. Severe voltage escalation occurs in these situations and this is what causes the unexplained insulation failures. The solution to this is to unground the power system by connecting the neutral point, supposedly at zero voltage to ground, through a high resistance. High resistance grounding has proven to be the most reliable form of power system grounding. It limits the available fault current to only a few amperes under ground fault conditions and in the event a ground fault occurs, one can continue to operate the system without the need to close down the circuit. This is a desirable feature for continuous process facilities where failure would result in significant losses. The high resistance connection provides damping for the voltage escalation thereby preventing a transient overvoltage from building up and causing failure. At the same time the resistance limits the available fault current to a very low value. The traditional way in the past of applying the high resistance grounding was to connect the neural point of a Wye connected surface power supply system to ground through a resistance, the value of which is selected to allow less than 10 amperes maximum current to flow under the worst case condition. For a Delta system, the neutral point is derived through three grounding transformers or a zig-zag grounding transformer. In the oil field industry, electrically submersible pumps and motors have been traditionally run ungrounded for surface continuity considerations as well as the extremely high cost of pulling the pump and motor up when it has faulted. This provides a perfect application for high resistance grounding. The high resistances grounding will allow the electrically submersible pumps to operate for a longer period of time under ground fault conditions. However, a frequent requirement of the oil well industry is to know what the down hole temperatures, pressures, etc. are. Existing down signals to the surface via line-to-ground connections using the power conductors as part of the signal path. A small signal is superimposed on the power lines and is transmitted to the surface. In this manner extremely expensive control wires of up to 15,000 feet in length are not required. As long as the power system is ungrounded this method is cost effective. However, it does not provide the transient over voltage protection provided by a high resistance grounding system, as the high resistance grounding system will short out the signals on the power conductors. It would be advantageous therefore, if an electrical power system for a down-hole oil well pump could be found that had all the advantageous of high resistance grounding as described previously, but which would also allow for the utilization of the power wiring to carry sensor signals from deep in the well. In the recent past, a system has been found to accomplish both purposes. High resistance grounding is provided but left unconnected until it is needed, as would be the case if an arcing ground fault were detected. That means that signals from an electronic monitoring systems deep in the well can be carried on the power lines of the pump to the surface, utilizing the well casing as a ground conductor. However, if an arcing ground fault occurs, the presence of common mode voltage variation can be quickly sensed at the surface and the high resistance ground can then be quickly inserted into the circuit to limit current and voltage excursions. Once this happens the control system signals are swamped out, but that is an acceptable compromise. At this point in time the protection of the personnel and equipment becomes more important. In the past, this system has utilized a gas discharge switch or tube in series with the grounding resistance. The grounding resistance is interconnected, for example, between the neutral of the power supply transformer and the aforementioned gas discharge tube in turn is interconnected to ground. If the voltage of the neutral of the aforementioned power supply transformer is at zero, then no current flows through the gas discharge tube and it remains an open circuit. If an arcing ground fault begins to cause the common mode voltage at the neutral of the transformer to build up, the current through the high resistance grounding system and the serially connected gas discharge tube causes the gas discharge tube to flash over or conduct thus connecting the high resistance to ground, thus bringing the voltage on the neutral of the aforementioned power transformer back to ground potential. This prevents dangerous arcing ground faults and extreme levels of voltage excursion and also provides a current limiting function. This system has a disadvantage in that the break-over voltage and conduction characteristics of the gas discharge tube, once chosen are fixed for each value of gas discharge tube utilized. It would be advantageous if a high resistance grounding system could be utilized, which was controlled to be in the off state during a time period when it was not needed, but which would be controlled to be turned on by way of a highly reliable system when needed. In such a system, values of current, voltage, etc. could be programmed into the system to provide a wide range of application in a single system. It would be advantageous if such a system could be found which improved the safety of the overall system, which could be used on either Wye or Delta transformers and which provided continuous operation during all ground fault conditions and also provided an alarm to advise personnel of ground fault condition.

SUMMARY OF THE INVENTION

In the present invention, a pair of inverse, parallel connected silicon controlled rectifiers (SCRs) or gated devices are connected between the primary grounding transformer and ground in a signal blocker system (SBS). The SCRs are controlled by circuitry that senses the voltage between the neutral of the output transformer and ground. For Delta connected sources, alternate grounding transformer schemes are utilized. In normal operation the electronic system is interconnected with the neutral of the Wye connected transformer and senses when the neutral to ground voltage begins to deviate substantially from zero. When this happen an electronic sensor system is programmed to cause the inverse parallel gated SCRs to fire, thus connecting the series connected high resistance resistor to ground through the now conducting SBS. A timed out relay coil then closes a normally opened parallel relay contact to continue to provide a current path through the high resistance resistor device to ground, until the fault has been cleared or the system otherwise repaired and made operational again.

In particular, an electrical system of the kind that operates normally in the ungrounded state, but which occasionally is subject to a conductor thereof being grounded, that is, where an undesirable voltage may be generated between a first portion of the electrical system and ground is provided. A grounding impedance device is interconnected to a second portion of the electrical system for reducing the undesirable voltage by connecting it to ground. The control system is interconnected with the grounding impedance device and the electrical system for sensing the undesirable voltage and connecting the grounding impedance device to the second portion of the electrical system for reducing the undesirable voltage. The control device comprises a gated conduction device, such as an SCR system, connected with the impedance for interconnecting the second portion of the electrical system through the impedance. A control device is interconnected with the gated conduction device for causing the gated conduction device to operate in response to the presence of an undesirable voltage. In an embodiment of the invention, the impedance device is primarily resistive and the first and second portions are the same. Furthermore the undesirable voltage is reduced substantially to zero. The system may be Wye connected or Delta connected or a combination of both. In one mode of operation, the system is utilized in an oil well electrical system of the kind which operates normally in the ungrounded state, but which occasionally is subject to a down hole power conductor thereof being grounded, such as for example, through an arcing ground fault. There is a surface located power source and a down hole pump motor driven by the power source. The aforementioned conductor is electrically disposed therebetween and the undesirable voltage is generated between first portion of the surface located power system neutral and ground.

BRIEF DESCRIPTION OF THE DRAWINGS

For a better understanding of the invention reference may be had to the preferred embodiment thereof shown in the accompanying drawings in which.

DESCRIPTION OF THE PREFERRED EMBODIMENT

Figure 1:
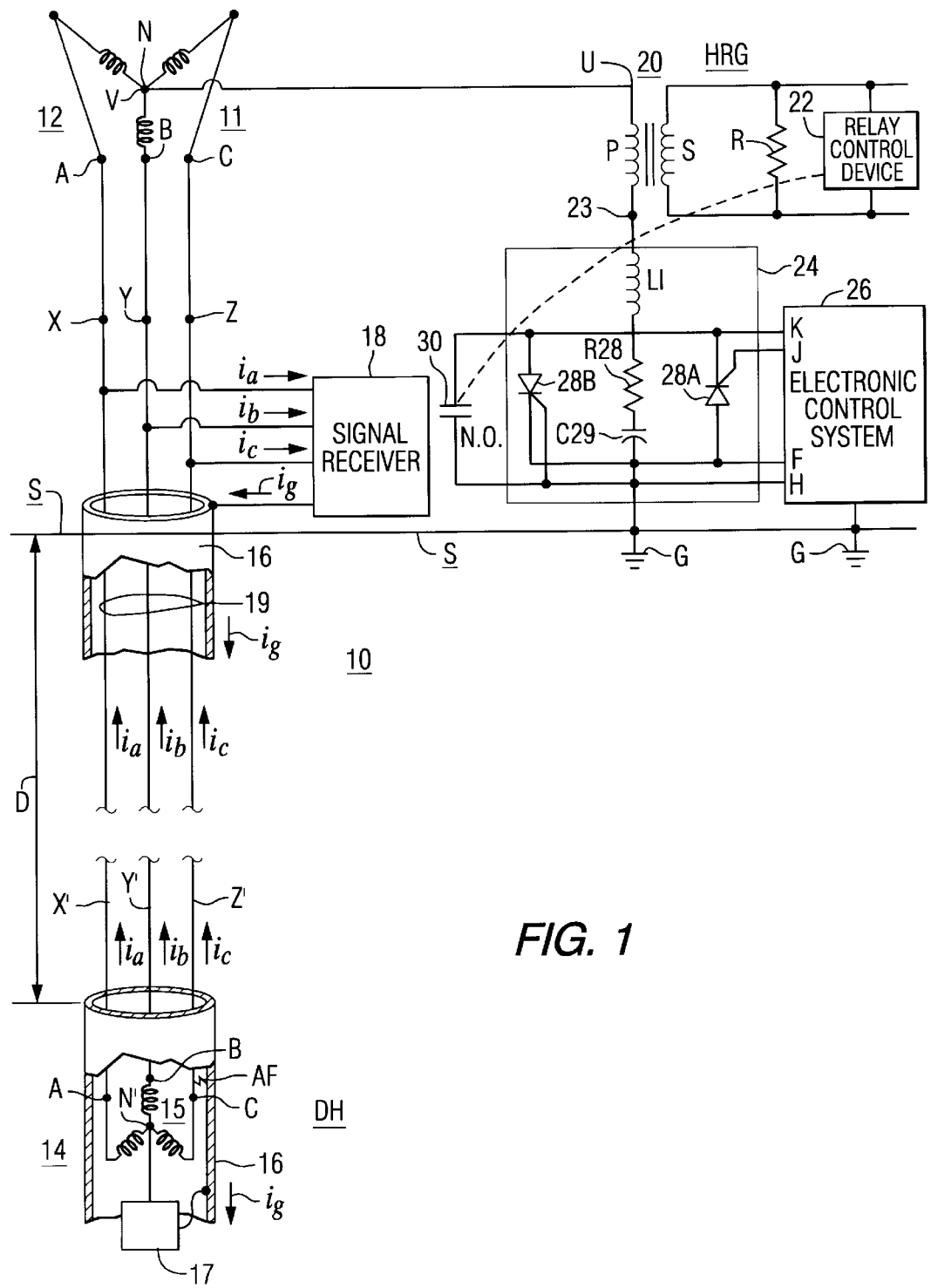
FIG. 1 shows a schematic view, partially broken away, of an electric oil well down hole pump system being driven by a surface power source with down hole signal sensing system and the signal blocker system of the present invention.

Referring now to the drawings and FIG. 1 in particular, FIG. 1 schematically shows an oil well system 10, which includes an above ground power supply system 11 the heart of which is a Wye connected power transformer secondary winding 12 (transformer) which provides power to a down hole electrical oil well pump 14 having Wye connected oil well pump motor windings 15. There is provided an electrically conductive well casing or inner production pipe 16 which traverses from the surface S above ground to the down hole region DH over a distance D. Interconnected with the windings 15 of the down hole electrical oil well pump 14 is a signal source 17. The signal source provides electrical signals to the neutral N' of the windings 15, at one terminal thereof and is interconnected with the conductive oil well casing 16 at the other terminal thereof. Above the surface S is a signal receiver 18. The windings 12 and the windings 15 each have phase lines A, B and C which are interconnected to terminals X, Y and Z and X', Y' and Z' respectively, between which generally traverse the long lines 19 from the surface S to down hole region DH. Signals $i_a$, $i_b$ and $i_c$ flow in lines A, B and C respectively between the signal source 17 and the signal receiver 18. Return or ground current $i_g$ flows between signal receiver 18 to signal source 17 through the casing 16 of the well. The signals $i_a$, $i_b$ and $i_c$ may be direct current, pulsed DC or 200 kilohertz ac signals, for example. It is not unusual for the distance D to be approximately 8,000 feet or greater. The signal source 17 may provide information related to well pressure, temperature and vibration for example, from the down hole region DH to surface S by way of the signals $i_a$, $i_b$ and $i_c$. The pump motor 14 represented by the windings 15 may be a 60 or 700 horsepower motor of the high voltage variety operating between, for example, 1100 volts and 4600 volts. The signals $i_a$, $i_b$ and $i_c$ generally range from 4 to 20 milliamps. The power supply system 11 may supply power in the magnitude of 12 hundred to 5 kilovolts at a frequency of 40 to 90 hertz. Generally, the lines 19 may drop 600 volts between the surface S and the down hole region DH due to their excessive length.

The transformer 12 has a neutral N capable of having a common mode voltage V disposed therebetween and ground. In an ideal situation where the power loads are balanced, the voltage V is generally zero volts. The neutral N is interconnected by way of a line to point U of a high resistance grounding system HRG. High resistance grounding system HRG may comprise a step down transformer 20 having the primary P thereof connected at one terminal thereof to the point U and the other terminal thereof connected to the input terminal 23 of a signal blocker 24. The other side or secondary S of the transformer 20 has connected thereacross a high resistance impedance or resistor R and parallel therewith a relay control device 22. Between terminal 23 and ground G of the system signal blocker 24 are interconnected an electronic control system 26 (to be described in greater detail with respect to FIG. 8) for the system signal blocker, a normally opened relay 30 and pair of oppositely disposed or inverse connected silicon controlled rectifiers or gated control devices 28A and 28B. The control system 26 interconnects with the gated silicon controlled rectifier 28B interconnected with the control system 26 by way of terminals F and H the voltage across which determine the firing status of silicon controlled rectifier 28B. On the other hand the silicon controlled rectifier 28A is controlled by the terminals J and K in the control system 26, which also has a voltage impressed thereacross which controls the firing status of the silicon controlled rectifier 28A. The series combination of the resistive element R28 and capacitive element C29 will operate with inductor LI to form an RLC circuit that limits the first derivative of system voltage with respect to time, that is the rate of rise of voltage across the silicon controlled rectifiers with respect to time. Said in another way, it is a high frequency filter for variable speed drives, in the event that variable speed drives are being utilized. In normal operation, when the voltage V is at approximately zero volts, the voltage on the primary P of the transformer 20 is essentially at zero and therefor the resistive value R is essentially out of the circuit, the normally opened relay contact 30 remains open and the oppositely disposed silicon controlled rectifiers 28A and 28B remain in a nonconductive state. Thus no electrical current flows between the neutral N of the transformer 12 and ground G, thus the resistive value R appears transparent or nonexistent to the voltage on the neutral N of the transformer 12. However, if an arcing ground fault AF occurs in a first portion of the electrical system, such as is shown in the down hole region DH, between line C and the casing 16, for example, it has a tendency to reduce the voltage between line C and ground and thus increase the voltage between line A and ground and line B and ground. The increased voltage on lines A and B has a tendency to escalate with the arcing ground fault condition, causing the voltage V on the neutral N of the transformer 12 in a second portion of the electrical system with respect to ground G to obtain some nonzero value. However, the primary P of the transformer 20 sees this voltage increase and reflects it through to the resistive value R. In addition, control system 26 senses the voltage between the point 23 and ground G and actuates the oppositely disposed silicon controlled rectifiers 28A and 28B to conduct. This places the resistance R in the circuit between the neutral N and ground G. This limits the current and damp the voltage V at the neutral N to a maximum of a line-to-neutral magnitude. At this point in time, the signals $i_a$, $i_b$ and $i_c$ are damped out or shorted out by the presence of resistive value R, but this is of no great consequence, as it is more desirable to cure the effects of the arcing ground fault at this time to prevent damage to down hole components. The voltage across the primary P of the transformer 20, which is reflected into the secondary S thereof actuates the relay control device 22, which with an appropriate time delay, closes the normally opened contact 30, thus eliminating the need for the control system to continue to control the silicon controlled rectifiers 28A and 28B to conduct and increasing the electronics' life.

The natural effect of all this is to increase the serviceability of the entire system 10, prevent the destruction of the down hole motor 14 and the sensors as indicated at 17. In an embodiment of the invention, the net resistive value seen between the neutral N and the ground G may be 130 ohms. The time delay provided by the relay control 22 may be 1.5 seconds. The grounding resistor R may be approximately 6 to 7 ohms. The secondary of the transformer S may be connected to a warning system (not shown) which directly or remotely indicates to personnel that an arcing ground fault has occurred or is occurring. The control system 26 for the signal blocker 24 provides a significant portion of the present invention. Its construction and use will be described hereinafter with respect to FIG. 8.

Figure 2:
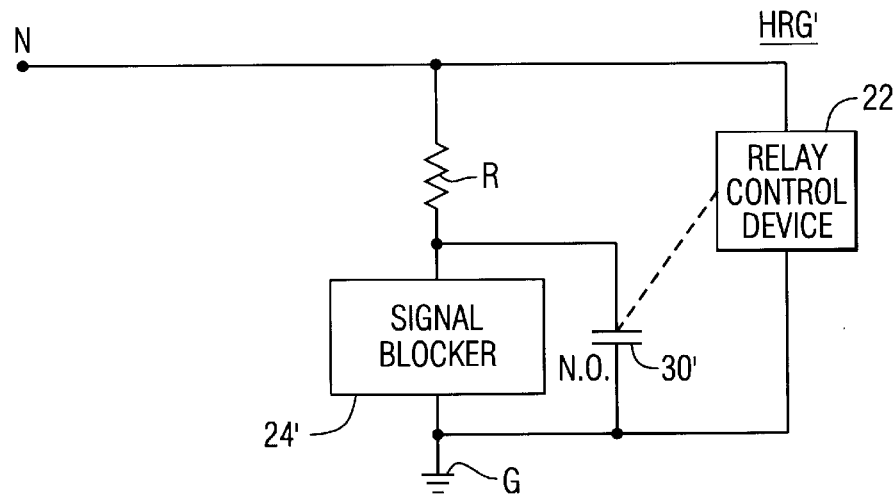
FIG. 2 shows a signal blocking arrangement similar to that shown in FIG. 1 for a low voltage embodiment of the invention.

Referring now to FIG. 2 an alternate embodiment HRG' of the high resistance grounding system is shown. In this case transformer 20 is not utilized. In this embodiment of the invention resistor R is directly connected between the neutral N of the transformer 12 (not shown) and ground G by way of a signal blocker 24'. Its counterpart shown to the right in FIG. 2 is relay 30'. Relay control 22 is interconnected to the terminal N and ground G to cause the normally open relay 30' to close when an appropriate voltage is imposed between the neutral N and ground G as a result of a voltage excursion due to the presence of an arcing ground fault or the like as was described previously. Once the normally open contact 30' closes, it remains that way, thus by-passing the signal blocker 24'.

Figure 3:
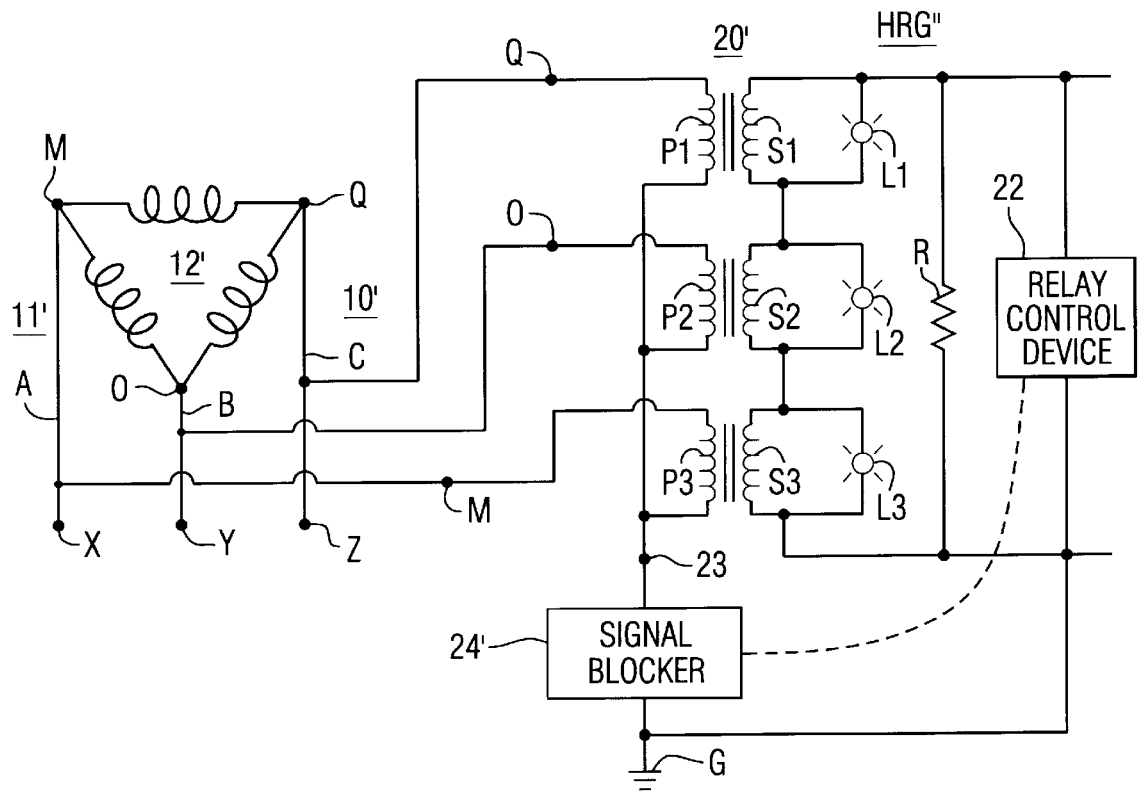
FIG. 3 shows a system similar to FIG. 1, disregarding the down hole portion of the power system, wherein the power system is Delta connected and the signal blocker and associated sensing system is modified accordingly.

Referring now to FIG. 3, another embodiment of the oil well system 10' is shown in which an above ground power supply 11' having a Delta connected transformer 12' is utilized. For purposes of simplicity of illustration, the down hole or below surface portion of the embodiment is not depicted as it operates in similar fashion to that described previously with respect to FIG. 1. In this embodiment of the invention, the transformer 12' comprises windings interconnected at common junctions M, O and Q to form a Delta connection. Junctions Q, O and M respectively are carried forward to the high resistive grounding system HRG" where they interconnect one terminal each with a terminal of primary windings P1, P2 and P3 of primary winding P of transformer 20'. The other sides of the windings P1, P2 and P3 are tied together and interconnected to the terminal 23 in the manner that was described previously. L1, L2 and L3 (or equivalent) relays can be used for determining when a phase voltage imbalance has occurred, thus triggering the remaining portion of the signal blocker 24' to actuate in a manner that was described previously. The secondary windings S1, S2 and S3 of the secondary S of the transformer 20' are tied together in broken delta and have connected there across the resistive element R and relay control device 22. The resistive element R is reflected through the secondary winding to the primary winding of the transformer 20' to act in a manner as described previously when the signal blocker 24' is actuated by its control system in the presence of ground voltage unbalance a junctions Q, O or M. Once again the relay control device 22 causes the normally open contact not shown in the signal blocker 24' to permanently short out the terminal 23 to ground G.

Figure 4:
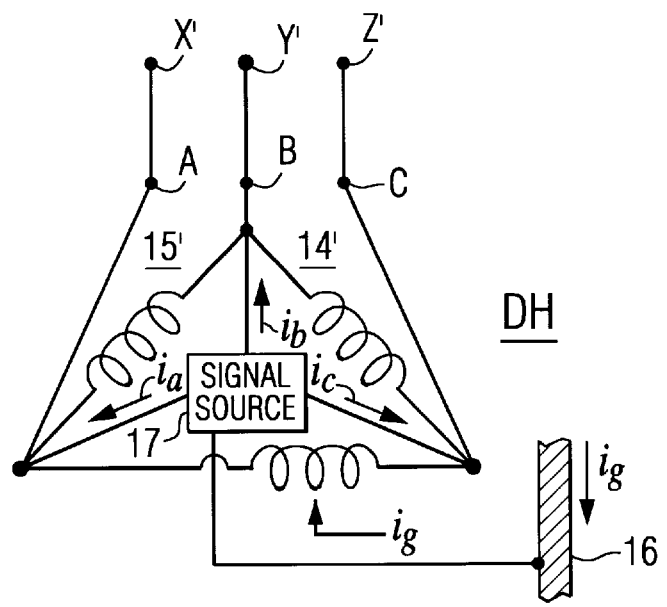
FIG. 4 shows a down hole Delta connected pump motor system suitable for use with the surface Wye connected power supply of FIG. 1 or the Delta connected surface power system of FIG. 3.

Referring now to FIG. 4, a Delta connected down hole pump 14' is depicted. In this embodiment of the invention the down hole electrical oil well pump 14' comprises Delta connected windings 15', which interconnect with the signal source 17 in a manner to provide the signal currents $i_a$, $i_b$ and $i_c$ to the lines A, B and C, to function in the manner that was described previously. As was the case previously, with respect to FIG. 1, the ground current $i_g$ for the signal source 17 flows through the casing 16. It is to be noted with respect to the embodiments of FIGS. 1, 3 and 4 that the above ground power supply arrangement and the down hole electrical oil pump arrangement may be mixed and matched in a convenient manner. That is to say, they both may be Delta connected, they both may be Wye connected, the upper one may be Wye connected and the lower one Delta connected or the upper one Delta connected, and the lower one Wye connected.

Figure 5:
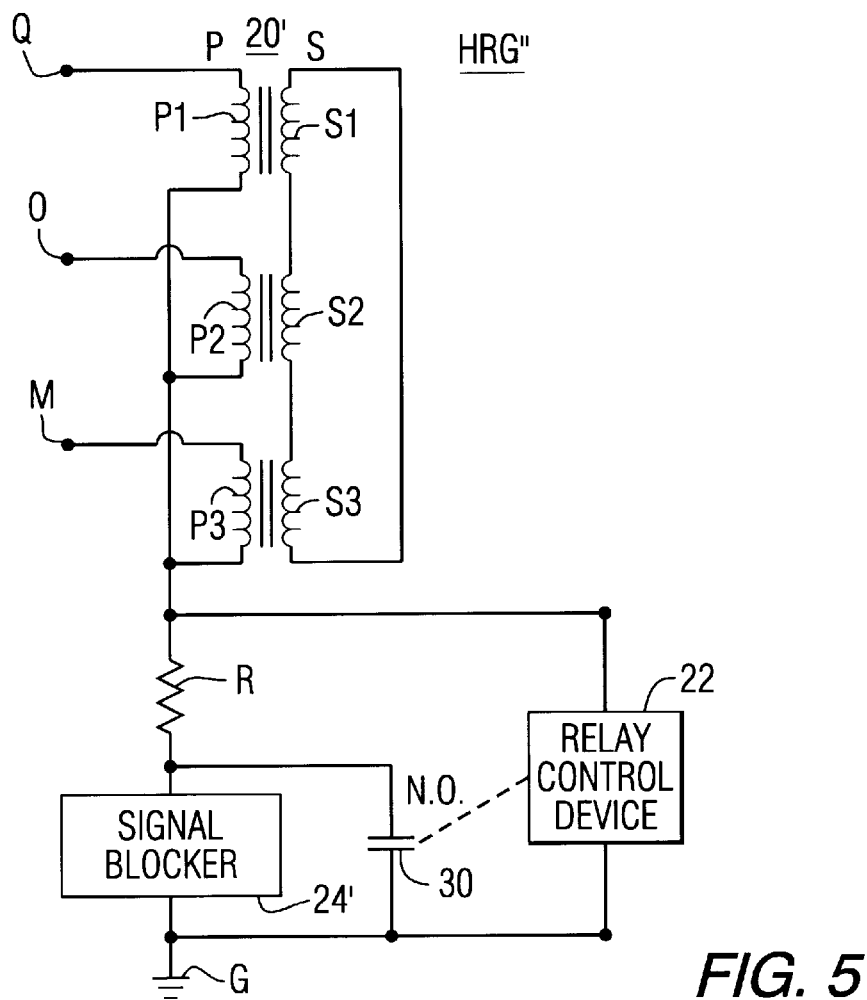
FIG. 5 shows a systems similar to that shown in FIG. 3, but for a low voltage arrangement.

Referring now to FIG. 5 an arrangement similar to FIG. 3 but for a low voltage embodiment is depicted. In particular the junctions Q, O and M are shown interconnected with the primary windings P1, P2 and P3 of the primary P of the transformer 20" of the high resistance grounding circuit HRG'". The secondary windings S1, S2 and S3 are interconnected together in a closed delta circuit relationship. When the system voltage across the signal blocker 24 exceeds design value, the system blocker 24' conducts, thus placing the resistance value R into the circuit in the manner that was described previously to basically achieve the results described previously. Once the resistor R conducts electrical current, the voltage thereacross is sensed by the relay control device 22 which in turn causes the relay 30 to close with a time delay as previously described, thus placing the resistor R into the circuit independent of the conduction characteristics of the silicon controlled rectifier within the system blocker 24'.

Figure 6:
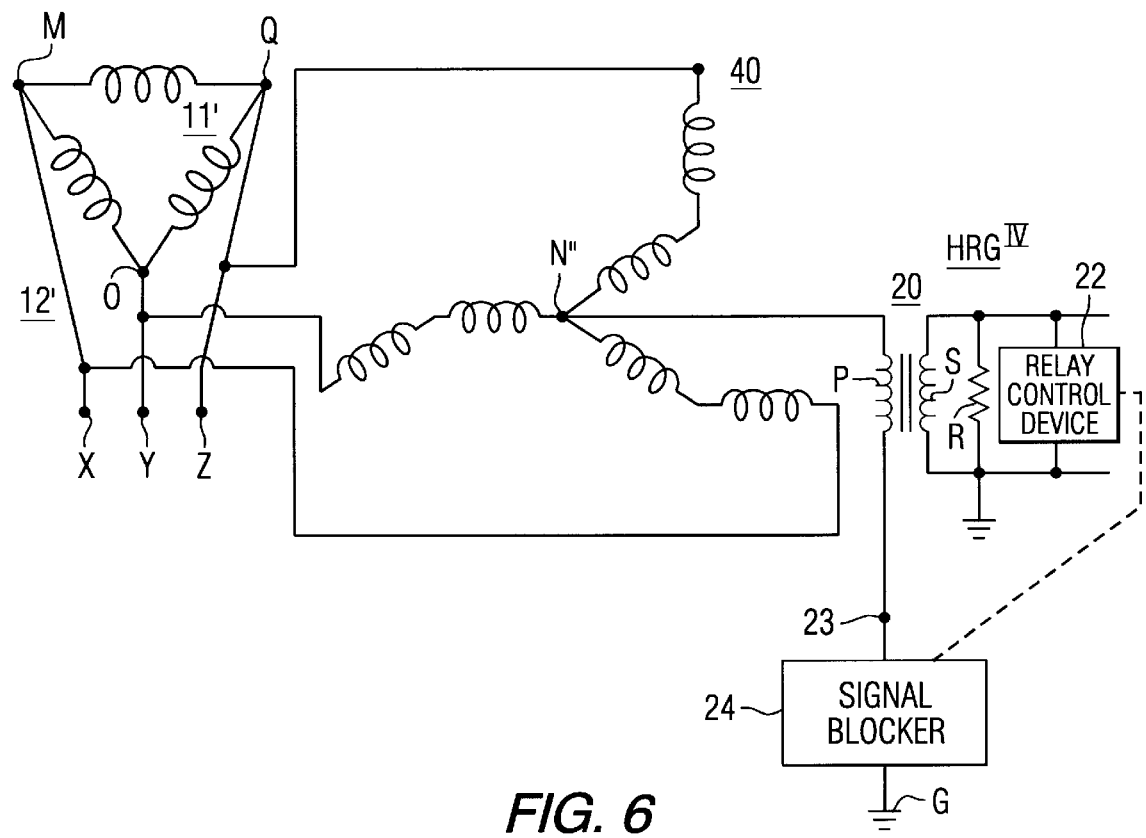
FIG. 6 shows a surface connected Delta power supply system utilizing a zig-zag sensing transformer arrangement and medium voltage sensing arrangement.
Figure 7:
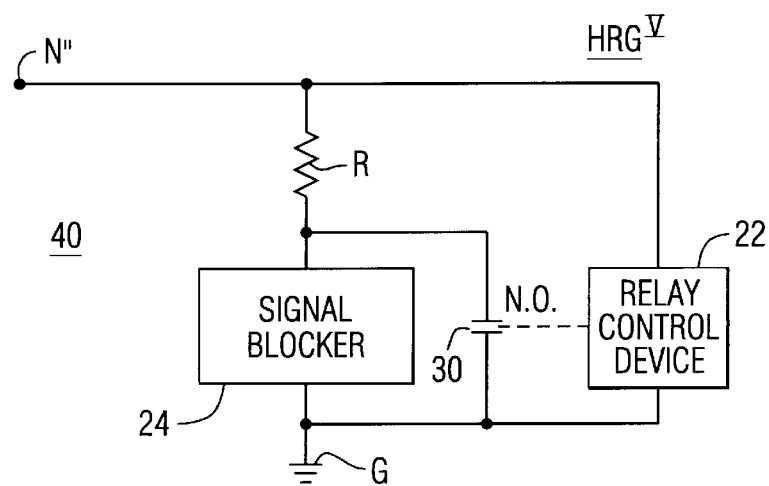
FIG. 7 shows an arrangement similar to FIG. 6, but for a low voltage sensing and signal blocker system.

Referring now to FIGS. 6 and 7, two other embodiments of the invention are shown in which a Delta connected transformer secondary 12' for an above ground power supply 11' is interconnected by way of an zig-zag transformer 40 to a signal blocker system 24. In the embodiment shown in FIG. 6, the high resistance grounding device HRGIV comprises the transformer 20 having the primary thereof interconnected between point 23 and the neutral N" of zig-zag transformer 40. The secondary S of the transformer 20 has connected thereacross the resistive value R and the relay control 22. Once again the control system 26 (not shown) within the system blocker 24 senses the voltages at terminals Q, O and M and acts to reflect the resistive value R between the neutral N" and the ground G as in the embodiment HRGV of FIG. 6, or directly interconnects the resistive element R between the neutral N' and the ground G as in the embodiment of FIG. 7. In the medium voltage embodiment of FIG. 6, the relay control 22 actuates the normally open contact (not shown) to provide a continuous insertion of the resistive element R as reflected though the transform 20 into the appropriate circuit. In the embodiment of FIG. 7, a relay control 22, upon sensing the voltage drop across the blocker 24, actuates the relay 30 to again dispose the resistor R into the circuit.

Figure 8A:
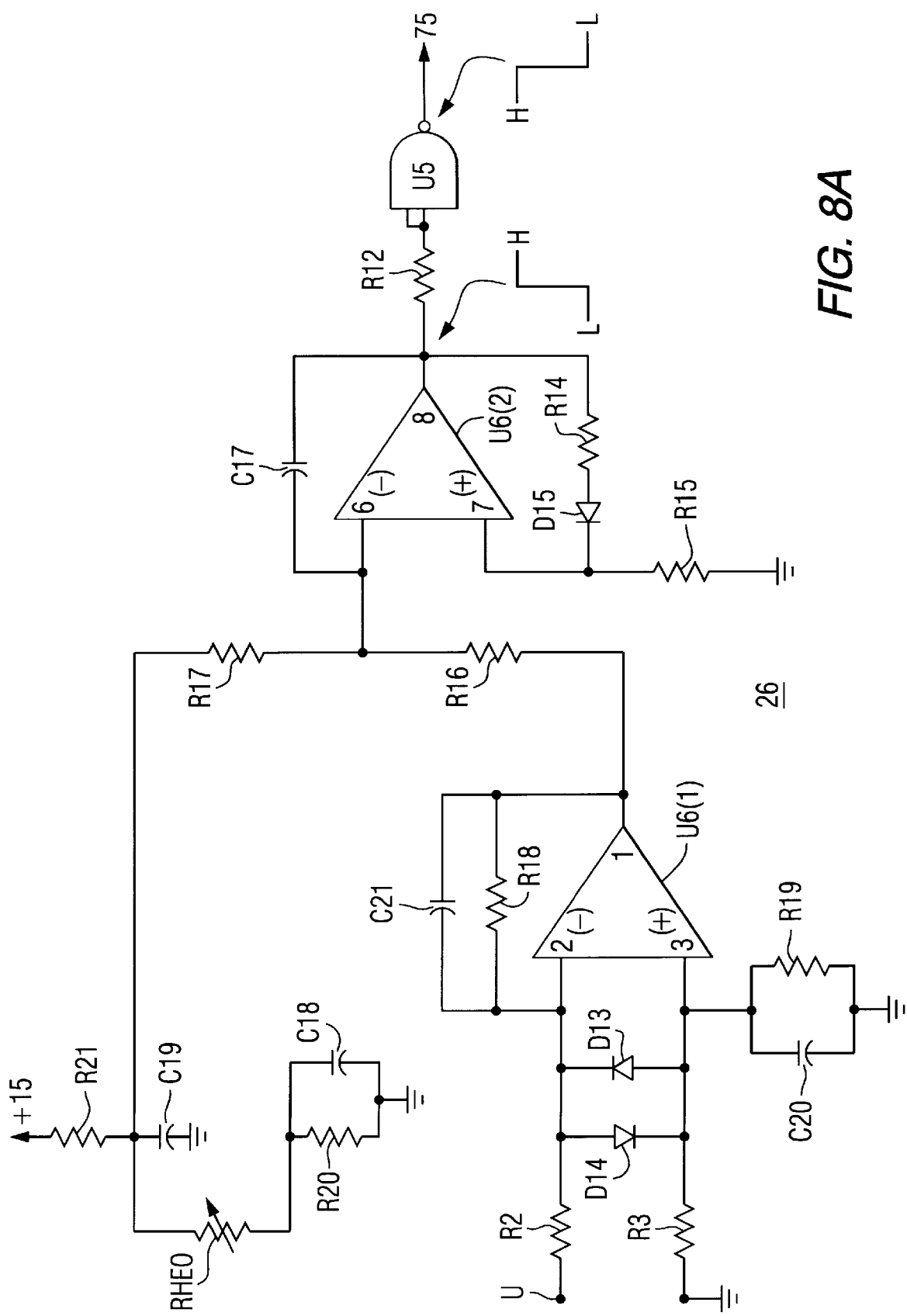
FIG. 8A and B show a schematic diagram of the control system of FIG. 1 for controlling the signal blocker as a function of voltage and current in the power supply and pump system of FIG. 1.
Figure 8B:
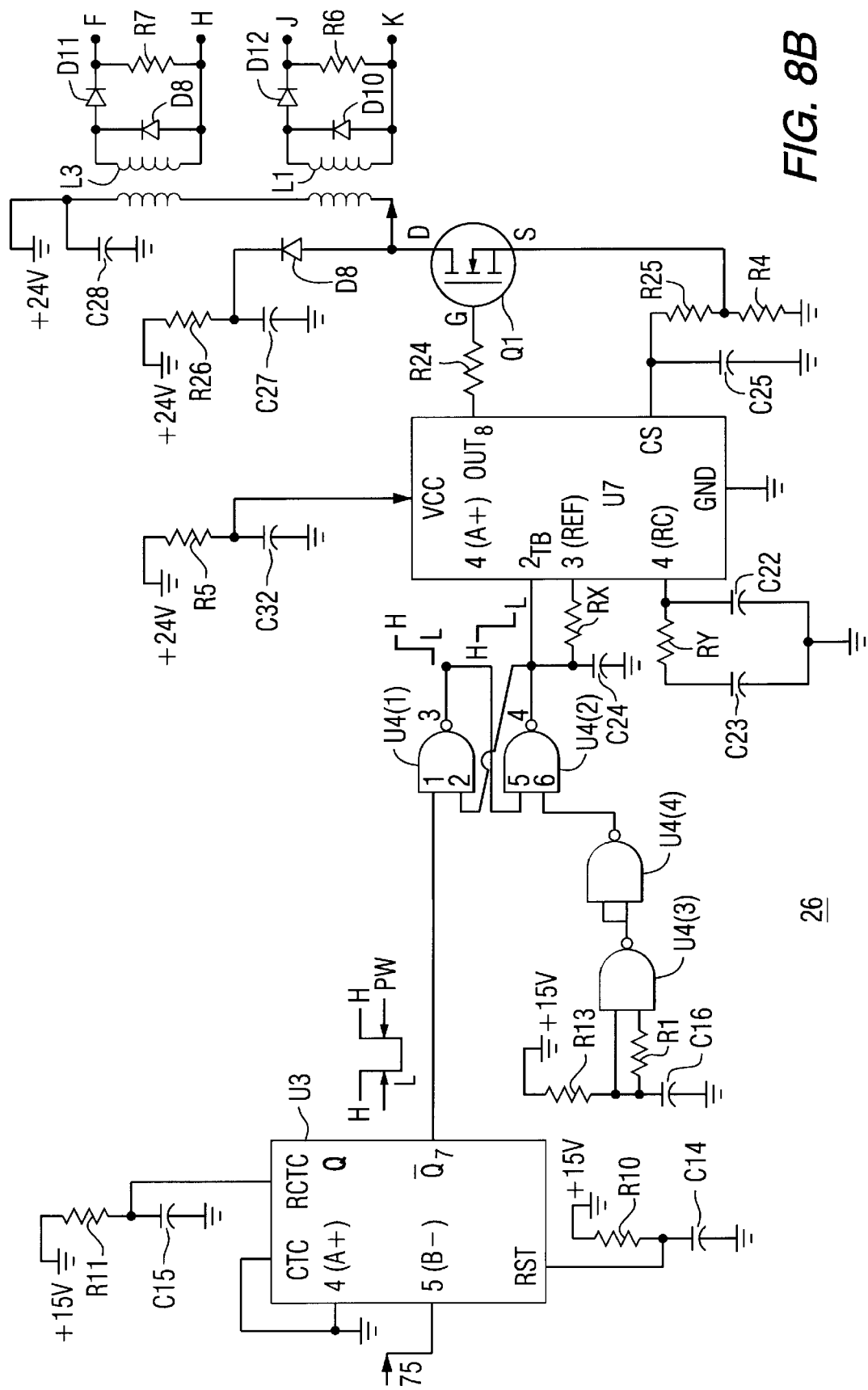

Referring now to FIG. 8 the construction and operation of control system 26, as it interacts with the remaining elements of the signal blocker 24 will be described. There is shown a resistive element R2 connected at one end with the junction point 23 as shown previously in FIG. 1, for example. The resistive element R2 is connected at its other end to an anode of diode D14, the negative input terminal (2) of an operational amplifier U6(1), one side of a resistive element R18, one side of a capacitive element C21 and the cathode of a diode D13. There is also shown a resistive element R3 connected at one side to system ground and at the other side thereof to the cathode of diode D14 and anode of diode D13, the positive terminal (3) of the operational amplifier U6(1), one side of a resistive element R19 and one side of a capacitive element C20. The other side of a resistive element R19 and the other side of a capacitive element C20 are connected to system ground. The other side of capacitive element C21 and the other side of resistive element R18 are connected to the output terminal (1) of the operational amplifier U6(1) and to one side of resistive element R16 forming a differential amplifier. The other side of resistive element R16 is connected to the negative input terminal (6) of operational amplifier U6(2) and to one side each of a resistive element R17 and a capacitive element C17. The other side of the resistive element R17 is connected to the junction between a resistive element R21, one side of a rheostat or variable resistor RHEO and one side of a capacitive element C19. The other side of a resistive element RHEO is connected to one side of the resistive element R20 and one side of a capacitive element C18, the other sides of which are grounded. The other side of capacitive element C19 is grounded and the other side of the resistive element R21 is connected to the positive 15 volt power supply. The output terminal (8) of the operational amplifier U6(2) is connected to the other side of capacitive element C17 and to one side of a resistive element R14. The other side of the resistive element R14 is connected to the anode of a diode D15 the cathode of which is connected to the positive input terminal (7) of the operational amplifier U6(2) and to one side of a resistive element R15, the other side of which is grounded. The output terminal (8) of the operational amplifier U6(2) is connected to one side of a resistive element R12, the other side of which is connected to input terminals of NAND inverter U5, the output of which is connected to the B− input terminal (5) of a monostable multi-vibrator circuit U3. The CTC input terminal of U3 is connected to the A+ input terminal (4) thereof and the system ground. The RCTC terminal of U3 is connected to the junction between a resistive element R11 and a capacitive element C15. The other side of resistive element R11 is connected to the positive 15 volt power supply and the other side of the capacitive element C15 connected to ground. The RST terminal of U3 is connected to a junction between a resistive element R10 and a capacitive element C14. The other side of resistive element R10 is connected to the positive 15 volt power supply and the other side of the capacitive element C14 is connected to ground. The output terminal (7) or Q-bar of U3 is connected to an input terminal (1) of a NAND gate device U4(1), the second input terminal (2) of which is connected to the output terminal (4) of second NAND gate device U4(2). The output terminal 3 of the U4(1) gate is connected to the input terminal (5) of U4(2). The two NAND gates are connected together to form a set-reset flip-flop. The input terminal (6) thereof is connected to a series connected combination of input devices U4(3) and U4(4). The first of these, U4(3), has an input terminal (8), which is connected to the junction between resistive element R13 and capacitive element C16. This combination forms a power up time delay for the flip-flop reset terminal (6) of U4(2). The second input (9) terminal thereof is also connected to the same junction, but through a resistive element R1. The other side of the resistive element R13 is connected to the plus 15 volt power supply and the other side of capacitive element C16 is connected to ground. The output (4) of the gate U4(2) is connected to the TB input terminal (2) of a current mode pulse width modulated circuit U7 and to the junction between a resistive device Rx and a capacitive element C24. The other end of the resistive device Rx is connected to the reference terminal REF at (3). The resistive element Ry is connected to the RC terminal (4) of U7 and to one side of a capacitive element C22. The other side of the resistive device Ry is connected to one side of a capacitive element C23. The CS terminal of U7 is connected to one side of the capacitive element C25. The other side of the capacitive elements C22, C23, C24, C25 and the GRND terminal of U7 are connected to ground. The VCC power supply terminal of U7 is connected to one side of a resistive element R5 and one side of a capacitive element C32. The other side of capacitive element C32 is connected to ground, and other side of resistive element R5 is connected to the positive 24 volt power supply. The output terminal (8) out of U7 is connected through resistive element 24 to the gate G of a field effects transistor Q1. The source S of the field effects transistor Q1 is connected to a junction between resistive elements R4 and R25. The other side of resistive element R25 is connected to the CS terminal of U7 and the other side of the resistive element R4 is connected to ground. The drain D of the field effect transistor Q1 is connected to the anode of a diode D8, the cathode of which is connected to one side each of resistive element R26 and capacitive element C27. The other side of capacitive element C27 is connected to ground and the other side of resistive element R26 is connected to the 24 volt power supply.

Although not shown for purposes of simplicity of illustration, a power supply for the circuitry of FIG. 8 is provided, which includes ±15 volts and ±24 volts DC power derived in a convenient manner.

Operation of the Control System 26

The differential amplifier formed by utilizing the operational amplifier U6(1) is such that it creates a −0.01 voltage gain between the terminal U and the output terminal (1) of the operational amplifier U6(1). The voltage is supplied to the capacitor formed by the operational amplifier U6(2). A reference voltage formed across the capacitive element C19 and controlled by the reostat RHEO cooperates with the voltage disposed at the bottom of the resistive element R16, such that if the voltage at pin (1) of the operational amplifier U6(1) is less than the reference voltage, then the voltage on the output terminal (8) of the operational amplifier U6(2) will be at a low. On the other hand, if the voltage at terminal (1) of the operational amplifier U6(1) is higher than the reference voltage, the output at the terminal (8) of the operational amplifier U6(2) will be at a high. The signal at terminal (8) of U6(2) is provided to NAND U5. As the output of U6(2) goes low to high the output of U5 goes high to low. The monostable multi-vibrator U3 is such that when the signal on its pin (5) undergoes a high to low transition, its Q-Bar output terminal (7) goes from high to low and then returns to high after a fixed period of time which amounts to the output pulse width PW. This pulse is then feed to the R-S flip-flop formed by the NAND gates U4(1) and U4(2). Thus when the neutral to earth ground voltage V of the secondary 12 of the transformer 11 of FIG. 1 exceeds the reference voltage established across capacitor C19 the R-S flip-flop is set, that is pin (3) on U4(1) goes high and pin (4) on U4(2) goes low. This results in the silicon controlled rectifiers 28A and 28B being gated on, thus causing the resistive element R to be interconnected either by way of a reflecting transformer or otherwise between the neutral N and ground of the appropriate power transformer, such as for example, transformer winding 12 of the transformer 11. In order that the silicon controlled rectifiers do not fire at power up, a low is forced on the flip-flop reset input, that is at pin (6) of U4(2) for a period of time determined by the time constant of the elements R15 and C16. The current mode PWM integrated circuit is configured such that it forms an oscillator, whose output frequency, which is approximately 10 Khz, is determined by the external RC time constant derived by resistive element Ry and capacitive element C24. The pulse train starts when pin (2) of device U7 goes low, that is the flip-flop U4(1) is set. When U7 pin (8) goes high, the field effect transistor Q1 is turned on resulting in current build up in the pulse transformer primary S of transformers L1 and L3, which current flows through resistive element R4. When there is voltage across resistive element R4, that is, when the primary current reaches a certain level, the pin (8) of device U7 will go low turning off the transistor Q1. The width of this pulse is approximately 2 microseconds. The pulse train continues until the 120 volt ac power, provided to the power supply is turned off. As a result of this, the pulse train is transformed to the secondary of the transformers L1 and L3 and the SCRs are continuously gated. The diodes D9, 10, 11 and 12 and the resistive elements R6 and R7 are added to form gate input circuits. SCR 28A is fed by outputs K-J and SCR 28B is fed by outputs F-H.

It is to be understood with respect to the embodiments of the invention, that the resistive elements shown herein made of different values for different embodiments of the invention and the resistance symbol R is used simply for purpose of simplicity. The transformers 20 and 20', for example, may be different transformer arrangements in different embodiments of the invention, as may be the relay control device 22 and actual system blocker 24 and 24' for example.

The apparatus taught with respect to this invention has many advantages. One advantages lies in the fact that the system blocker may utilize the electronic circuitry on the control system 26 in such a manner as to provide one electronic circuit for utilization with many different kinds and configurations of oil well systems 10 without having to change the control system other than to change control parameters and settings thereon and therein.

What we claim as our invention is:

1. An electrical system of the kind which operates normally in the ungrounded state but which occasionally is subject to a conductor thereof being grounded, wherein an undesirable voltage is generated between a first portion of said electrical system and ground, comprising:
   grounding impedance means interconnectable to a second portion of said electrical system for reducing said undesirable voltage by connecting said second portion to ground;
   control system means interconnected with said grounding impedance means and said electrical system for sensing said undesirable voltage and connecting said grounding impedance means to said second portion of said electrical system for reducing said undesirable voltage;
   said control system means, comprising:
      gated conducted means interconnected with said impedance means for interconnecting said second portion of said electrical system means to ground through said impedance means for reducing said undesirable voltage; and
      control means interconnected with said gated conduction means for causing said gated conduction means to interconnect said second portion of said electrical system means to ground in response to the presence of said undesirable voltage.

2. The combination as claimed in claim 1, wherein said impedance means comprises primarily resistance means.

3. The combination as claimed in claim 1, wherein said undesirable voltage is reduced to acceptable limits.

4. The combination as claimed in claim 1, wherein said gated conduction means comprise parallel oppositely disposed silicon controlled rectifiers.

5. The combination as claimed in claim 1, wherein sensor means is interconnected with said conductor for signal transmission there through.

6. A Wye connected electrical system of the kind which operates normally in the ungrounded state but which occasionally is subject to a conductor thereof being grounded wherein an undesirable voltage is generated between the neutral of said Wye connected electrical system and ground, comprising:

grounding impedance means interconnectable to said neutral for reducing said undesirable voltage by connecting said second portion to ground;

control system means interconnected with said grounding impedance means and said Wye connected electrical system for sensing said undesirable voltage and connecting said grounding impedance means to neutral for reducing said undesirable voltage;

said control system means, comprising:
gated conducted means interconnected with said impedance means for interconnecting said neutral to ground through said impedance means for reducing said undesirable voltage; and control means interconnected with said gated conduction means for causing said gated conduction means to interconnect said neutral to ground in response to the presence of said undesirable voltage.

7. The combination as claimed in claim 6, wherein said impedance means comprises primarily resistance means.

8. The combination as claimed in claim 6, wherein said undesirable voltage is reduced to acceptable limits.

9. The combination as claimed in claim 6, wherein said gated conduction means comprise parallel oppositely disposed silicon controlled rectifiers.

10. The combination as claimed in claim 6, wherein sensor means is interconnected with said conductor for signal transmission therethrough.

11. A Delta connected electrical system of the kind which operates normally in the ungrounded state but which occasionally is subject to a conductor thereof being grounded wherein an undesirable voltage is generated between a portion of said delta connected electrical system and ground, comprising:

grounding impedance means interconnectable to said portion of said Delta connected electrical system for reducing said undesirable voltage by connecting said second portion to ground;

control system means interconnected with said grounding impedance means and said delta connected electrical system for sensing said undesirable voltage and connecting said grounding impedance means to said portion of said delta connected electrical system for reducing said undesirable voltage;

said control system means, comprising:
gated conducted means interconnected with said impedance means for interconnecting said portion of said Delta connected electrical system to ground through said impedance means for reducing said undesirable voltage; and control means interconnected with said gated conduction means for causing said gated conduction means to interconnect said portion of said Delta connected electrical system to ground in response to the presence of said undesirable voltage.

12. The combination as claimed in claim 11, wherein said impedance means comprises primarily resistance means.

13. The combination as claimed in claim 11, wherein said undesirable voltage is reduced to acceptable limits.

14. The combination as claimed in claim 11, wherein said gated conduction means comprise parallel oppositely disposed silicon controlled rectifiers.

15. The combination as claimed in claim 11, wherein sensor means is interconnected with said conductor for signal transmission there through.

16. An electrical system of the kind which operates normally in the ungrounded state but which occasionally is subject to a conductor thereof being grounded, wherein an undesirable voltage is generated between a first portion of said electrical system and ground, comprising:

said electrical system comprising a power source means and a load means, with said conductor being electrically disposed therebetween;

grounding impedance means interconnectable to a second portion of said electrical system for reducing said undesirable voltage by connecting said second portion substantially to ground;

control system means interconnected with said grounding impedance means and said electrical system for sensing said undesirable voltage and connecting said grounding impedance means to said second portion of said electrical system for reducing said undesirable voltage;

said control system means, comprising:
gated conducted means interconnected with said impedance means for interconnecting said second portion of said electrical system means to ground through said impedance means for reducing said undesirable voltage; and Control means interconnected with said gated conduction means for causing said gated conduction means to interconnect said second portion of said electrical system means to ground in response to the presence of said undesirable voltage.

17. The combination as claimed in claim 16, wherein said impedance means comprises primarily resistance means.

18. The combination as claimed in claim 16, wherein said undesirable voltage is reduced to acceptable limits.

19. The combination as claimed in claim 16, wherein said gated conduction means comprise parallel oppositely disposed silicon controlled rectifiers.

20. The combination as claimed in claim 16, wherein is said power source means is Wye connected and said load means is Wye connected.

21. The combination as claimed in claim 16, wherein is said power source means is Delta connected and said load means is Delta connected.

22. The combination as claimed in claim 16, wherein is said power source means is Wye connected and said load means is Delta connected.

23. The combination as claimed in claim 16, wherein is said power source means is Delta connected and said load means is Wye connected.

24. The combination as claimed in claim 16, wherein sensor means is interconnected with said conductor for signal transmission there through.

25. An oil well electrical system of the kind which operates normally in the ungrounded state but which occasionally is subject to a down hole conductor thereof being grounded, comprising:

a surface located power source means and a down hole pump motor means, with said conductor being electrically disposed therebetween, wherein an undesirable voltage is generated between a first portion of said surface located power source means and ground as a result of said down hole conductor being grounded;

surface located grounding impedance means interconnectable to a surface located second portion of said surface located power source means for reducing said undesirable voltage by connecting said second portion substantially to ground;

surface located control system means interconnected with said surface located grounding impedance means and said surface located power source means for sensing said undesirable voltage and connecting said grounding impedance means to said second portion of said surface located power source means for reducing said undesirable voltage;

said control system means, comprising:

gated conduction means interconnected with said impedance means for interconnecting said second portion of said surface located power source means to ground through said impedance means for reducing said undesirable voltage; and control means interconnected with said gated conduction means for causing said gated conduction means to interconnect said second portion of said surface located power source means to ground in response to the presence of said undesirable voltage.

26. The combination as claimed in claim 25, wherein said impedance means comprises primarily resistance means.

27. The combination as claimed in claim 25, wherein said undesirable voltage is reduced to acceptable limits.

28. The combination as claimed in claim 25, wherein said gated conduction means comprise parallel oppositely disposed silicon controlled rectifiers.

29. The combination as claimed in claim 25, wherein is said power source means is Wye connected and said down hole pump motor means is Wye connected.

30. The combination as claimed in claim 25, wherein is said power source means is Delta connected and said down hole pump motor means is Delta connected.

31. The combination as claimed in claim 25, wherein is said power source means is Wye connected and said down hole pump motor means is Delta connected.

32. The combination as claimed in claim 25, wherein is said power source means is Delta connected and said down hole pump motor means is WYe connected.

33. The combination as claimed in claim 25, wherein said down hole sensor means is interconnected with said down hole conductor means for signal transmission therethrough to the surface.

34. An oil well electrical system of the kind which operates normally in the ungrounded state but which occasionally is subject to a down hole conductor thereof being subjected to an arcing ground fault, comprising:

a surface located power source means and a down hole pump motor means, with said conductor being electrically disposed therebetween, wherein an undesirable voltage is generated between a first portion of said surface located power source means and ground as a result of said down hole conductor being subjected to said arcing ground fault;

surface located grounding impedance means interconnectable to a surface located second portion of said surface located power source means for reducing said undesirable voltage by connecting said second portion substantially to ground;

surface located control system means interconnected with said surface located grounding impedance means and said surface located power source means for sensing said undesirable voltage and connecting said grounding impedance means to said second portion of said surface located power source means for reducing said undesirable voltage;

said control system means, comprising:

gated conduction means interconnected with said impedance means for interconnecting said second portion of said surface located power source means to ground through said impedance means for reducing said undesirable voltage; and control means interconnected with said gated conduction means for causing said gated conduction means to interconnect said second portion of said surface located power source means to ground in response to the presence of said undesirable voltage.

35. The combination as claimed in claim 34, wherein said impedance means comprises primarily resistance means.

36. The combination as claimed in claim 34, wherein said undesirable voltage is reduced to acceptable limits.

37. The combination as claimed in claim 34, wherein said gated conduction means comprise parallel oppositely disposed silicon controlled rectifiers.

38. The combination as claimed in claim 34, wherein is said power source means is Wye connected and said down hole pump motor means is Wye connected.

39. The combination as claimed in claim 34, wherein is said power source means is Delta connected and said down hole pump motor means is Delta connected.

40. The combination as claimed in claim 34, wherein is said power source means is Wye connected and said down hole pump motor means is Delta connected.

41. The combination as claimed in claim 34, wherein is said power source means is Delta connected and said down hole pump motor means is Wye connected.

42. The combination as claimed in claim 34, wherein said down hole sensor means is interconnected with said down hole conductor means for signal transmission therethrough to the surface.

* * * * *